(12) United States Patent
Shimada et al.

(10) Patent No.: US 11,664,748 B2
(45) Date of Patent: May 30, 2023

(54) DRIVE CONTROL DEVICE AND DRIVE CONTROL METHOD THAT ENABLE STABLE OUTPUT TO BE OBTAINED FROM VIBRATION TYPE ACTUATOR, VIBRATION TYPE DRIVE DEVICE INCLUDING VIBRATION TYPE ACTUATOR, AND APPARATUS

(71) Applicant: CANON KABUSHIKI KAISHA, Tokyo (JP)

(72) Inventors: Akira Shimada, Saitama (JP); Akio Atsuta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 17/231,219

(22) Filed: Apr. 15, 2021

(65) Prior Publication Data

US 2021/0234480 A1 Jul. 29, 2021

Related U.S. Application Data

(63) Continuation of application No. PCT/JP2019/039654, filed on Oct. 8, 2019.

(30) Foreign Application Priority Data

Oct. 15, 2018 (JP) .............................. JP2018-194399

(51) Int. Cl.
*H02N 2/14* (2006.01)
*H02N 2/10* (2006.01)
(Continued)

(52) U.S. Cl.
CPC ............. *H02N 2/145* (2013.01); *H02N 2/103* (2013.01); *G02B 7/02* (2013.01); *G02B 7/09* (2013.01); *G03B 13/36* (2013.01)

(58) Field of Classification Search
CPC ........ H02N 2/145; H02N 2/103; H02N 2/142; H02N 2/106; G02B 7/02; G02B 7/09;
(Continued)

(56) References Cited

U.S. PATENT DOCUMENTS 6,054,795 A * 4/2000 Yamamoto ............... H02N 2/14
310/317
7,183,691 B2 2/2007 Yamamoto
(Continued)

FOREIGN PATENT DOCUMENTS

JP 09-163770 A 6/1997
JP 2005-102431 A 4/2005
(Continued)

OTHER PUBLICATIONS

International Search Report and Written Opinion dated Dec. 24, 2019, in International Patent Application No. PCT/JP2019/039654.

*Primary Examiner* — Emily P Pham
(74) *Attorney, Agent, or Firm* — Venable LLP

(57) ABSTRACT

A drive control device 100, which controls driving of a vibration type actuator 200 including a vibrator 214 that includes a piezoelectric element 203, and a rotor 207, includes amplifier circuits 11 and 12 amplifying a power supply voltage to generate a drive voltage to be applied to the piezoelectric element 203, and a microcomputer unit 1. The microcomputer unit 1 performs a control to increase the amplitude of the drive voltage to perform acceleration from when the vibration type actuator 200 is started to when a target speed of the rotor 207 is reached, decrease the frequency of the drive voltage without changing the amplitude of the drive voltage when power supplied to the piezoelectric element 203 exceeds a first power limit P-Lim$_1$, and increase the amplitude of the drive voltage
(Continued)

when the power falls below a second power limit P-Lim$_2$ during an operation of decreasing the frequency.

20 Claims, 10 Drawing Sheets

(51) Int. Cl.
   *G02B 7/02*      (2021.01)
   *G02B 7/09*      (2021.01)
   *G03B 13/36*     (2021.01)
(58) Field of Classification Search
   CPC ............... G02B 7/102; G03B 13/36; G03B 2205/0084; B06B 1/06
   See application file for complete search history.

(56) References Cited

U.S. PATENT DOCUMENTS

| | | | |
|---|---|---|---|
| 7,339,305 | B2 | 3/2008 | Yamazaki et al. |
| 9,000,691 | B2 | 4/2015 | Atsuta |
| 10,833,610 | B2 * | 11/2020 | Sumioka ............... H02N 2/142 |
| 2019/0348927 | A1 | 11/2019 | Atsuta |

FOREIGN PATENT DOCUMENTS

| | | | |
|---|---|---|---|
| JP | 2013-123335 A | 6/2013 |
| JP | 2014-233166 A | 12/2014 |
| JP | 5791343 B2 | 10/2015 |
| WO | 2005/088823 A1 | 9/2005 |

\* cited by examiner

DRIVE CONTROL DEVICE AND DRIVE CONTROL METHOD THAT ENABLE STABLE OUTPUT TO BE OBTAINED FROM VIBRATION TYPE ACTUATOR, VIBRATION TYPE DRIVE DEVICE INCLUDING VIBRATION TYPE ACTUATOR, AND APPARATUS

CROSS-REFERENCE TO RELATED APPLICATIONS

This application is a Continuation of International Patent Application No. PCT/JP2019/039654, filed Oct. 8, 2019, which claims the benefit of Japanese Patent Application No. 2018-194399, filed Oct. 15, 2018, both of which are hereby incorporated by reference herein in their entirety.

BACKGROUND OF THE INVENTION

Field of the Invention

The present invention relates to a drive control device and a drive control method that enable a stable output to be obtained from a vibration type actuator, a vibration type drive device including the vibration type actuator, and an apparatus.

Background Art

As a non-electromagnetic drive actuator, a vibration type actuator, which brings a vibrator and a contact body into contact with each other and excites vibration in the vibrator to make the vibrator and the contact body move relative to each other, has been known. The vibrator has, for example, a structure in which an electrical-mechanical energy conversion element such as a piezoelectric element is bonded to an elastic body. In the vibration type actuator, an AC voltage is applied to the electrical-mechanical energy conversion element to generate high-frequency vibration in the vibrator, and vibration energy of the high-frequency vibration is output as a mechanical motion in which the vibrator and the contact body move relative to each other.

The vibration type actuator is applied to various electronic devices, and is used, for example, to drive an image pickup lens in an image pickup apparatus. Generally, a battery is used as a power source in an image pickup apparatus. For example, a technology, in which a battery voltage is boosted by a DC/DC converter and then further boosted to a predetermined voltage value by an LC resonant circuit, has been known. An electrical resonant frequency of the LC resonant circuit in this case is defined as $1/\{2\pi \times (L \times C)^{1/2}\}$.

Patent Literature 1 proposes a technology in which when the vibration type actuator is started by increasing a pulse width in a certain frequency range, the increase of the pulse width is stopped when a current value exceeds a predetermined value to prevent the current value from being further increased, thereby effectively utilizing the limited power supplied from the battery. Further, in Patent Literature 1, when a relative movement speed is equal to or lower than a target speed, a control is performed to increase the relative movement speed by shifting a drive frequency to the lower frequency side while keeping the pulse width fixed until the relative movement speed reaches the target speed.

CITATION LIST

Patent Literature

Patent Literature 1: Japanese Patent No. 5791343

In order to meet the demand for further simplification of circuits included in an electronic device and cost reduction, a driving method for the vibration type actuator may include a driving method in which the voltage of the battery is directly boosted by the LC resonant circuit without using the DC/DC converter, and the electrical resonant frequency is brought close to the mechanical resonant frequency of the vibrator to increase a boosting rate, thereby obtaining a high output. However, in a case where the electrical resonant frequency is brought close to the mechanical resonant frequency, the output greatly fluctuates in a drive frequency range, which is a new problem.

This problem will be described with reference to FIG. 10. FIG. 10 is a diagram showing a relationship between a drive frequency of the vibration type actuator and a drive voltage (a voltage applied to the electrical-mechanical energy conversion element). The broken line shows a case where a mechanical resonant frequency fr' and an electrical resonant frequency fe' are away from each other, and the solid line shows a case where a mechanical resonant frequency fr and an electrical resonant frequency fe are close to each other. In a case where the two resonant frequencies are away from each other (broken line), since the amount ΔV' of voltage change in the drive frequency range is small, the fluctuations in output and power are small. However, since the voltage level is low, it is often necessary to use a mechanism for boosting the voltage, such as the DC/DC converter, to boost a power supply voltage. On the other hand, in a case where the two resonant frequencies are close to each other (solid line), although the voltage level itself is high, the amount ΔV of voltage change in the drive frequency range becomes large, and therefore, the fluctuations in output and power become large in the drive frequency range, which is problematic.

SUMMARY OF THE INVENTION

The present invention provides a simple vibration type drive device in which a stable output can be obtained from a vibration type actuator even in a case where the amount of voltage change is large over a drive frequency range because the mechanical resonant frequency and the electrical resonant frequency are close to each other.

A vibration type drive device according to the present invention includes: a vibration type actuator including a vibrator and a contact body that move relative to each other; and a drive control device configured to control a drive voltage to be applied to the vibration type actuator and a frequency of the drive voltage, in which the drive control device increases the drive voltage to accelerate driving of the vibration type actuator from when the vibration type actuator is started to when a target speed of the relative movement is reached, the drive control device decreases the frequency of the drive voltage without changing the drive voltage when power supplied to the vibrator exceeds a first power value, and the drive control device increases the drive voltage when the power falls below a second power value that is smaller than the first power value during an operation of decreasing the frequency.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. In the following description, a vibration type drive device includes a vibration type actuator and a drive control device that controls the vibration type actuator.

First Embodiment

Figure 1:
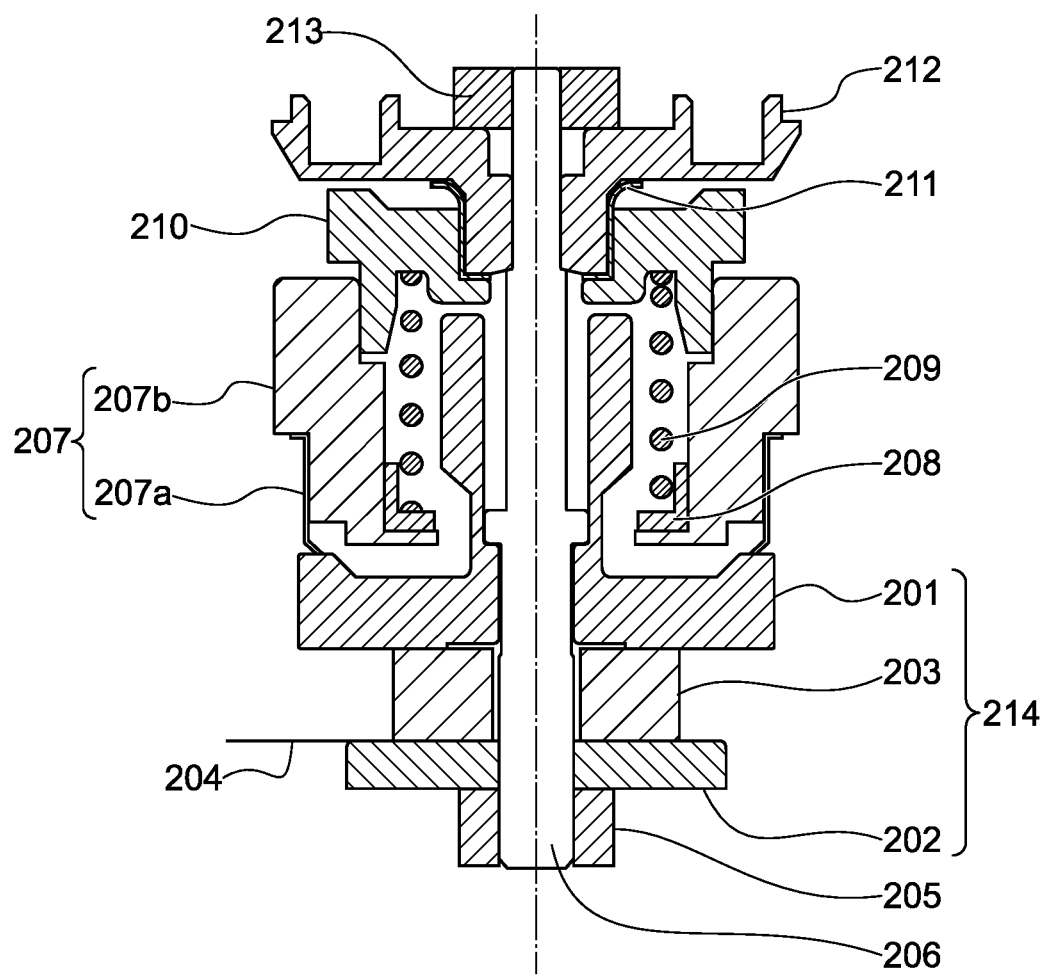
FIG. 1 is a cross-sectional view showing a schematic configuration of a vibration type actuator.

FIG. 1 is a cross-sectional view showing a schematic configuration of a vibration type actuator 200 included in a vibration type drive device. The vibration type actuator 200 has a substantially columnar shape as a whole. The vibration type actuator 200 includes a first elastic body 201, a second elastic body 202, a piezoelectric element 203, a flexible printed circuit board 204, a lower nut 205, and a shaft 206. The first elastic body 201, the second elastic body 202, the piezoelectric element 203, and the flexible printed circuit board 204 are fastened in an axial direction (thrust direction) of the shaft 206 so that a predetermined holding force is applied by the shaft 206 and the lower nut 205. The first elastic body 201, the second elastic body 202, and the piezoelectric element 203 form a vibrator 214, and the vibrator 214 is fixed at a predetermined position on the shaft 206.

The first elastic body 201 is formed of a material with low vibration loss, and excellent wear resistance and excellent corrosion resistance. For example, metal or ceramics can be selected for the first elastic body 201, and martensitic stainless steel (for example, a high hardness material such as SUS440C) is particularly preferable. Here, the first elastic body 201 is obtained by cutting a member of SUS440C and then quenching and nitriding the cut SUS440C member to improve wear resistance.

The piezoelectric element 203 is an electrical-mechanical energy conversion element. Here, the piezoelectric element 203 having a structure in which a plurality of ring-shaped piezoelectric bodies having front and back surfaces on which electrodes are formed is stacked in the axial direction of the shaft 206 is used. The piezoelectric element 203 may be formed by alternately stacking a plurality of thin plate-shaped piezoelectric ceramics and electrode layers and sintering the piezoelectric ceramics and the electrode layers at the same time (integral sintering type), or may be formed by stacking a plurality of single-plate type piezoelectric bodies each having front and back surfaces on which electrodes are formed and fastening the stacked piezoelectric bodies in a stacking direction (Langevin type).

Each electrode layer of the piezoelectric element 203 includes an A-phase electrode, a B-phase electrode, an A'-phase electrode, and a B'-phase electrode. Such a structure of the piezoelectric element 203 is disclosed in, for example, Japanese Laid-Open Patent Publication (kokai) No. 2013-123335, and thus, illustration and a detailed description thereof will be omitted. It is possible to excite two bending vibrations orthogonal to each other in the vibrator 214 by applying alternating current (AC) voltages (hereinafter, referred to as "drive voltages") having a predetermined phase difference to the A-phase electrode, the B-phase electrode, the A'-phase electrode, and the B'-phase electrode via the flexible printed circuit board 204. Spatial phases of these two bending vibration modes around an axis are shifted by 90 degrees (90°), and the two bending vibrations can have a temporal phase difference of 90 degrees by changing the phase of the drive voltage. As a result, the bending vibrations of the vibrator 214 rotate around the shaft 306, and an elliptical motion is generated on the first elastic body 201 (a surface that is in contact with a contact portion 207a of a rotor 207 to be described later).

Due to the bending vibrations of the vibrator 214, an electric charge is generated in the piezoelectric element 203 by a direct piezoelectric effect. Therefore, the vibration state of the vibrator 214 can be monitored by detecting the electric charge. Accordingly, in the piezoelectric element 203, for example, one of two electrodes formed by dividing one of a plurality of A-phase electrodes is used as a sensor electrode for monitoring the vibration state. In this case, a phase difference between the drive voltage applied to the A-phase electrode and an output signal from the sensor electrode is 90 degrees at the resonant frequency, and is gradually increased toward higher frequencies than the resonant frequency. Therefore, it is possible to monitor a relationship between the frequency of the drive voltage input to the piezoelectric element 203 and the resonant frequency of the vibrator 214 by detecting the phase difference between the drive voltage applied to the A-phase electrode and the output signal from the sensor electrode in a state where the vibration is excited in the vibrator 214. Further, it is possible to stably drive the vibration type actuator 200 by performing a control to be described later on the basis of the monitoring result.

The vibration type actuator 200 includes the rotor 207 (contact body), a rotor rubber 208, a pressing spring 209, a gear 210 which is an output transmission member, a bearing 211, a flange 212, and an upper nut 213. The flange 212 disposed on the upper end side of the shaft 206 is fixed to the shaft 206 by screwing the upper nut 213 to the shaft 206. The flange 212 is a member for fixing the vibration type actuator 200 at a predetermined position on an apparatus (equipment) on which the vibration type actuator 200 is mounted.

The rotor 207 includes a rotor main ring 207b and the contact portion 207a. The contact portion 207a is fixed to the rotor main ring 207b with an adhesive. A surface of a lower end (an end facing the vibrator 214) of the contact portion 207a is in contact with the first elastic body 201, and the contact portion 207a is bent so that the diameter of the surface of the lower end is smaller than the diameter of a surface of an upper end. As a result, the contact portion 207a has an appropriate level of elasticity. The contact portion 207a is preferably formed of a material having favorable abrasion resistance, mechanical strength, and corrosion resistance. For example, stainless steel such as SUS420J2 is preferably used. In the vibration type actuator 200, the contact portion 207a is formed by performing press working with low production cost and excellent dimensional accuracy, and performing quenching to improve wear resistance. It should be noted that a method for fixing the contact portion 207a to the rotor main ring 207b is not limited to the method using an adhesive, and may include other methods such as metal brazing such as soldering, welding such as laser welding or resistance welding, and mechanical joining such as press fitting or caulking.

The rotor 207 is pressed against the vibrator 214 by the pressing spring 209 through the rotor rubber 208, and is in contact with the vibrator 214. By generating the above-described elliptical motion in the vibrator 214, a frictional driving force can be applied to the rotor 207 to rotate the rotor 207. It should be noted that the rotor rubber 208 has a function of equalizing a pressing force and dampening vibration transmitted from the rotor 207 to the gear 210.

In the axial direction of the shaft 206, the gear 210 is disposed between the flange 212 and the first elastic body 201 via the bearing 211. A concave portion formed in an upper surface of the rotor main ring 207b and a convex portion formed on the gear 210 are engaged with each other. The gear 210 receives a force from the pressing spring 209 and rotates integrally with the rotor 207 while sliding with respect to the bearing 211 to output a rotational driving force to the outside.

Figure 2:
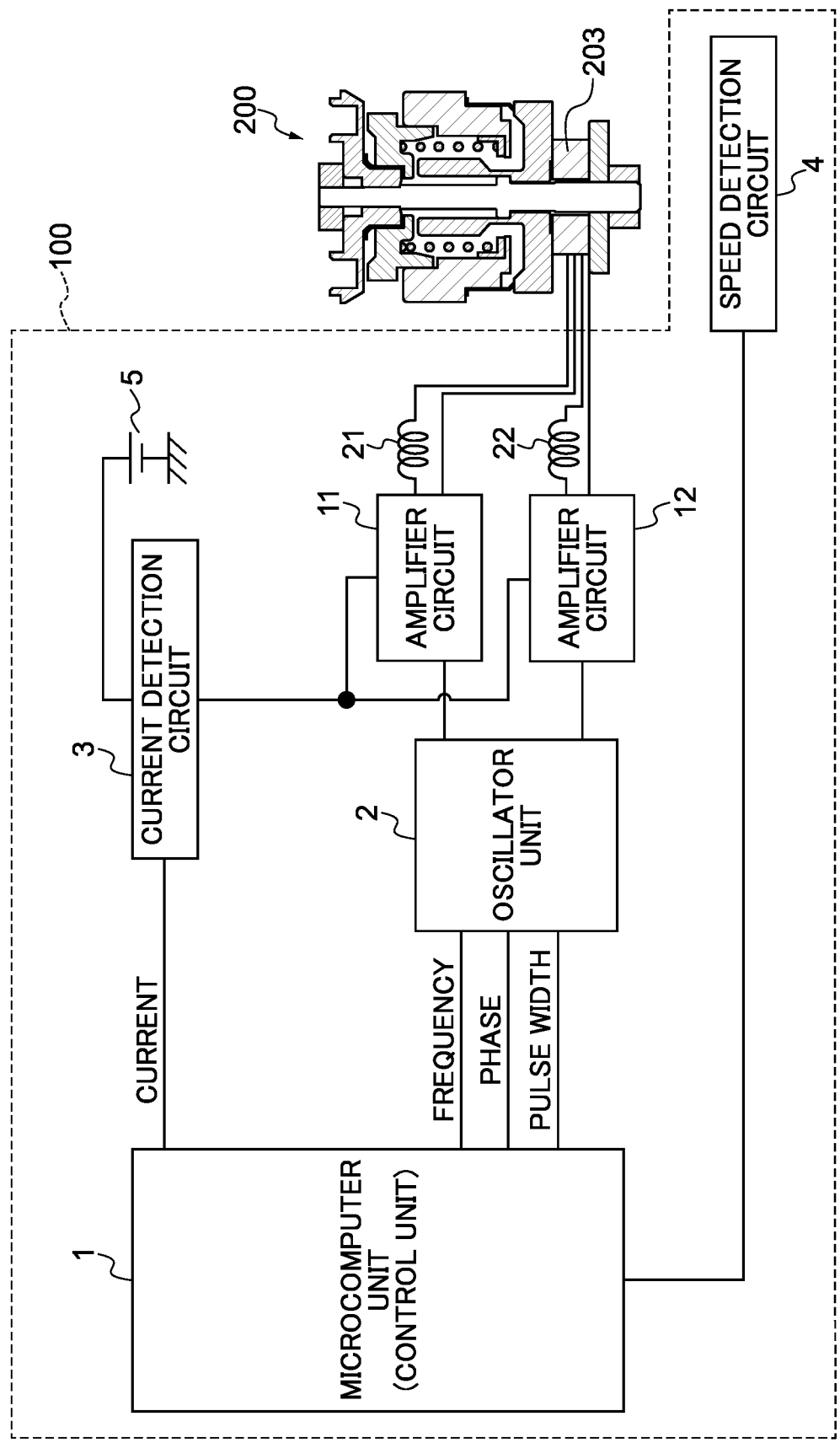
FIG. 2 is a block diagram showing a configuration of a drive control device.

FIG. 2 is a block diagram showing a schematic configuration of a drive control device 100 included in the vibration type drive device. The drive control device 100 includes a microcomputer unit 1, an oscillator unit 2, a current detection circuit 3, a speed detection circuit 4, a power supply unit 5, amplifier circuits 11 and 12, and impedance elements 21 and 22.

The microcomputer unit 1 is a control unit that comprehensively controls the driving of the vibration type actuator 200. In order to excite the above-described vibrations in the vibrator 214, the oscillator unit 2 generates four pulse signals, an A-phase pulse, an A'-phase pulse, a B-phase pulse, and a B'-phase pulse, as pulse signals which are drive signals in response to a command value from the microcomputer unit 1.

The amplifier circuits 11 and 12 and the impedance elements 21 and 22 function as drivers in the drive control device 100. The amplifier circuit 11 switches the voltage (power supply voltage) of the power supply unit 5 with the A-phase pulse and the A'-phase pulse, boosts the power supply voltage in combination with the impedance element 21, and generates drive voltages to be applied to the piezoelectric element 203. The amplifier circuit 12 switches the power supply voltage with the B-phase pulse and the B'-phase pulse, boosts the power supply voltage in combination with the impedance element 22, and generates drive voltages to be applied to the piezoelectric element 203. The drive voltages of two different phases generated by the amplifier circuit 11 with the A-phase pulse are applied to the A-phase electrode and the A'-phase electrode of the piezoelectric element 203, and a detailed description thereof will be provided later with reference to FIGS. 3A and 3B. Further, the drive voltages generated by the amplifier circuit 12 with the B-phase pulse are applied to the B-phase electrode and the B'-phase electrode of the piezoelectric element 203.

The power supply unit 5 is a power source such as a battery that supplies a direct current (DC) voltage to the amplifier circuits 11 and 12. The current detection circuit 3 is a current detection unit that detects a current supplied from the power supply unit 5. The product of a current detected by the current detection circuit 3 and a voltage command value given to the amplifier circuits 11 and 12 can be calculated to calculate consumed power (hereinafter, referred to as "power"). The calculated power is input to the microcomputer unit 1 and used as information for performing a drive sequence to be described later.

The speed detection circuit 4 detects the speed (rotation speed) and position (rotation angle) of the rotor 207, and transmits information on the detected speed and position of the rotor 207 to the microcomputer unit 1. The microcomputer unit 1 controls the rotation of the rotor 207 by controlling the A-phase pulse and the B-phase pulse for generating the drive voltages to be applied to the piezoelectric element 203 on the basis of the received information on the speed and position of the rotor 207.

Figure 3A:
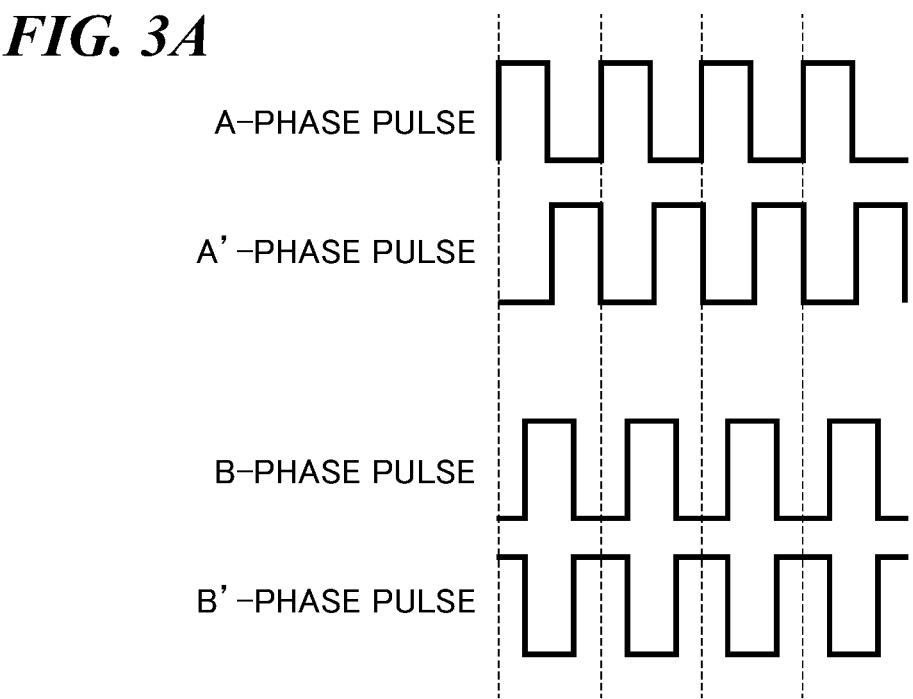
FIG. 3A is a diagram for describing a drive signal.
Figure 3B:
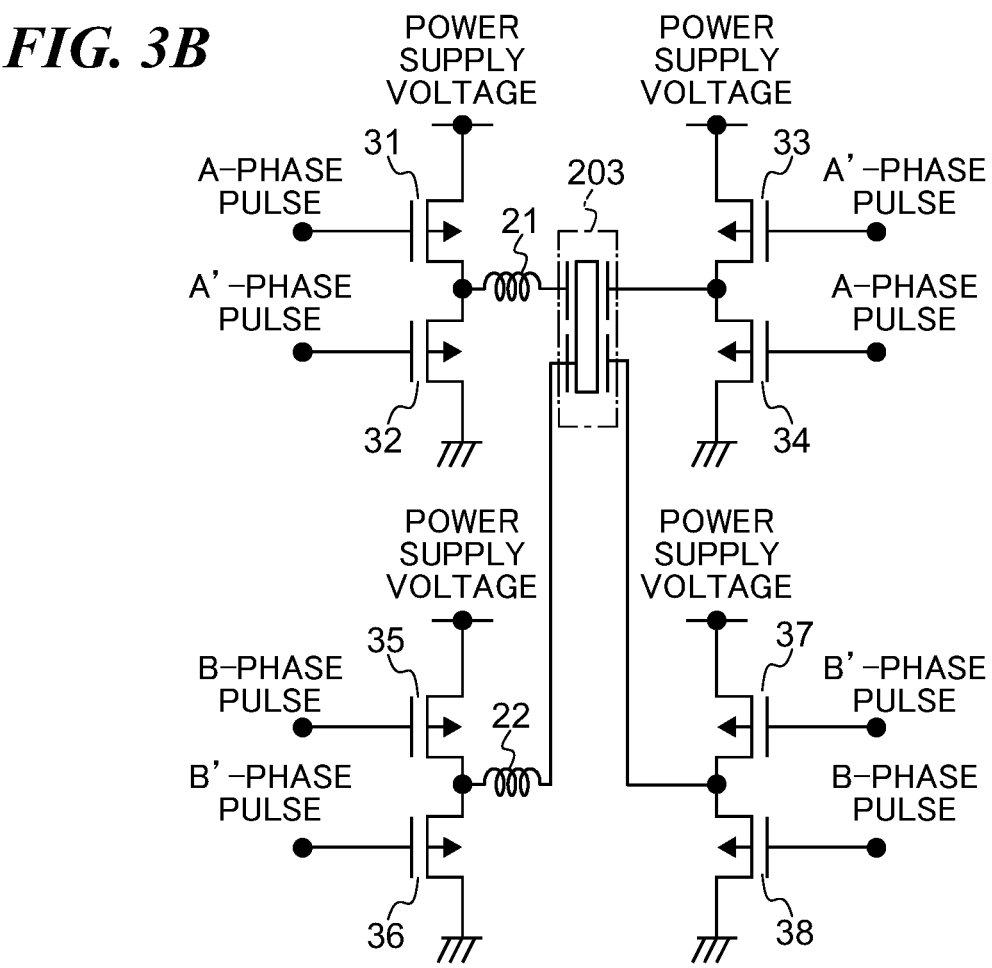
FIG. 3B is a diagram for describing a configuration of an amplifier circuit.

FIG. 3A is a diagram for describing the drive signals (the A-phase pulse, the B-phase pulse, the A'-phase pulse, and the B'-phase pulse). FIG. 3B is a circuit diagram of the amplifier circuits 11 and 12. As shown in FIG. 3A, the phases of the A-phase pulse and the A'-phase pulse are shifted by 180 degrees, the phases of the B-phase pulse and the B'-phase pulse are shifted by 180 degrees, and the pulse widths of the respective drive signals (duty) are equal. Here, the phases of the A-phase pulse and the B-phase pulse are shifted by 90 degrees.

FETs 31 to 38 are used as switching elements included in the amplifier circuits 11 and 12. The FETs 31 and 34 perform switching due to the A-phase pulse, and the FETs 32 and 33 perform switching due to the A'-phase pulse. The drive voltages generated from the power supply voltage through switching motions of the FETs 31 to 34 are applied to the A-phase electrode and the A'-phase electrode. The FETs 35 and 38 perform switching due to the B-phase pulse, and the FETs 36 and 37 perform switching due to the B'-phase pulse. The drive voltages generated from the power supply voltage through switching motions of the FETs 35 to 38 are applied to the B-phase electrode and the B'-phase electrode.

The impedance elements 21 and 22 serve to perform impedance matching with the vibration type actuator 200, and here, inductance elements are used. By incorporating the impedance elements 21 and 22 at the predetermined positions shown in FIGS. 2, 3A, and 3B, the vibration type actuator 200 can be driven with a lower power supply voltage and with high efficiency. It should be noted that, although not shown, a capacitive element may be provided in parallel with the vibrator 214 for performing impedance matching.

The rate of boosting performed by the drivers including the amplifier circuits 11 and 12 and the impedance elements 21 and 22 has a maximum value at the electrical resonant frequency fe which is the resonant frequency of the drivers. $fe=1/\{2\pi \times (L \times C)^{1/2}\}$, in which the inductance of the impedance elements 21 and 22 is L and the capacitance of the piezoelectric element 203 is C. In the drive control device 100, the range of the drive frequency (the frequency of the drive signal) is brought close to the electrical resonant frequency fe to increase the drive voltage to be applied to the piezoelectric element 203, thereby implementing a circuit configuration in which a DC/DC converter which is a boosting unit is not used. It should be noted that increasing the drive voltage means increasing the voltage value of the effective drive voltage. A method for changing the voltage value of the effective drive voltage includes a method of changing the amplitude or pulse width of the drive voltage.

Figure 10:
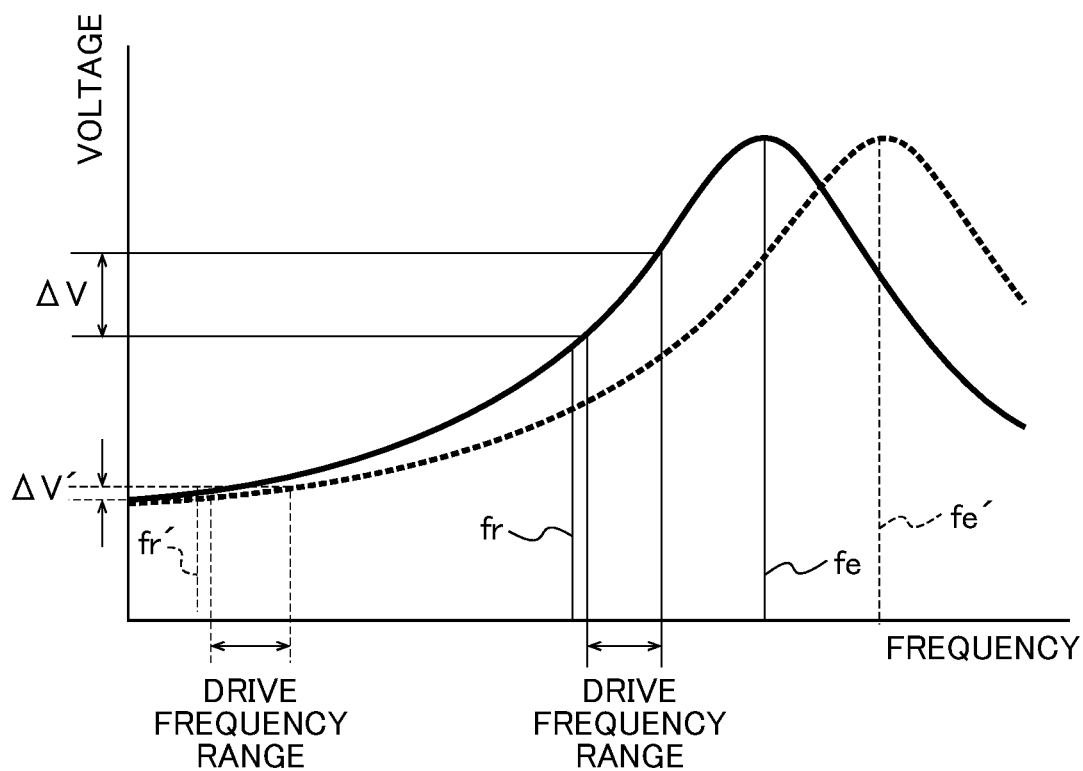
FIG. 10 is a diagram showing a relationship between a drive frequency of the vibration type actuator and the drive voltage.

Further, in the vibration type actuator 200, the vibration amplitude can be increased by using a mechanical resonance phenomenon of the vibrator 214, thereby driving the rotor 207 at a high speed. Therefore, bringing the drive frequency range close to the electrical resonant frequency fe is equivalent to bringing the mechanical resonant frequency fr close to the electrical resonant frequency fe. However, as described above with reference to FIG. 10, in a case where the mechanical resonant frequency fr is excessively close to the electrical resonant frequency fe, the output of the vibration type actuator becomes unstable. On the other hand, in a case where the mechanical resonant frequency fr is away from the electrical resonant frequency fe, the output becomes insufficient when there is no boosting unit such as the DC/DC converter. Considering the balance of these problems, it is desirable that the difference (fe-fr) between the mechanical resonant frequency fr and the electrical resonant frequency fe is 8 kHz to 30 kHz.

Figure 4:
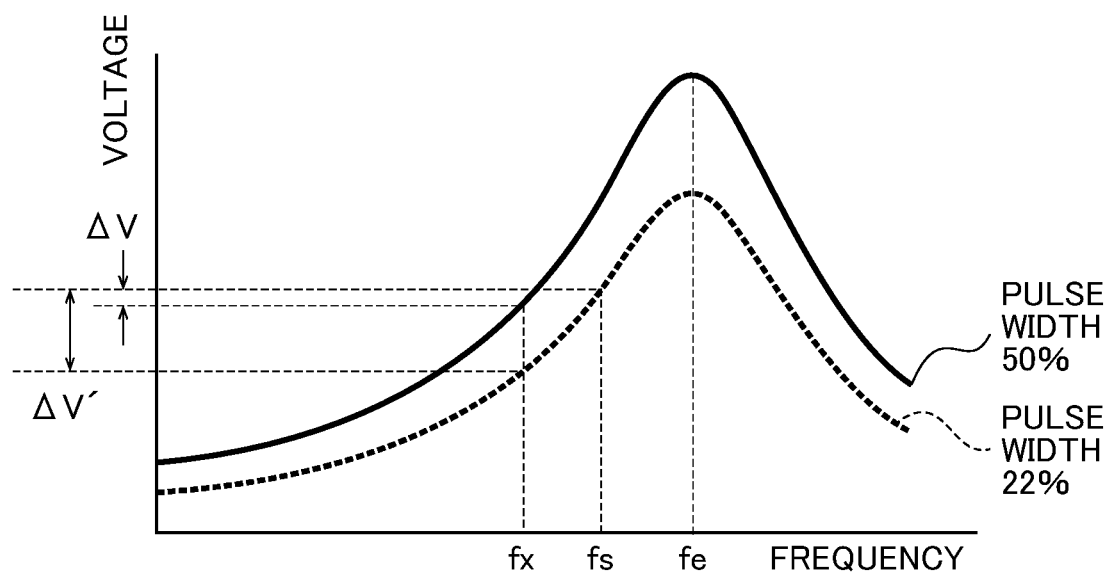
FIG. 4 is a diagram showing a relationship between a resonant frequency of the vibration type actuator and a drive voltage.
Figure 5:
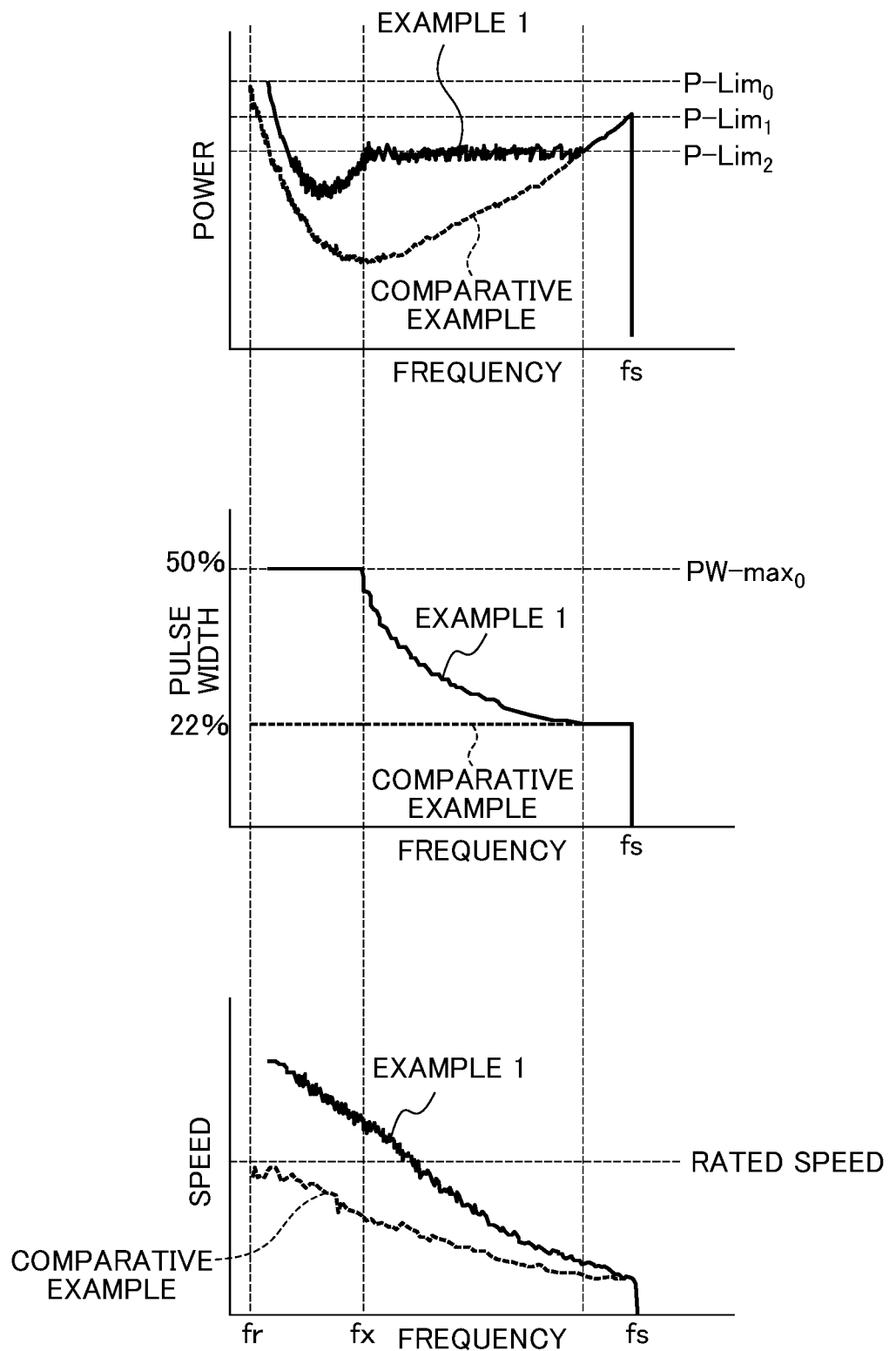
FIG. 5 is a diagram showing comparison of characteristics in drive sequences according to Example 1 and Comparative Example, respectively.

Next, a drive control method for the vibration type actuator 200, performed by the drive control device 100 will be described. First, the outline of the control of the vibration type actuator 200 will be described with reference to FIGS. 4 and 5. FIG. 4 is a diagram showing a relationship between various resonant frequencies of the vibration type actuator 200 and the drive voltage. FIG. 5 is a diagram showing comparison of characteristics in drive sequences of the vibration type actuator 200 according to Example 1 and Comparative Example, respectively. The upper part of FIG. 5 shows a relationship between the drive frequency and the power, the middle part of FIG. 5 shows a relationship between the drive frequency and the pulse width, and the lower part of FIG. 5 shows a relationship between the drive frequency and the speed.

The microcomputer unit 1 gradually increases the pulse width (duty cycle) of the drive signals (the A-phase pulse, the A'-phase pulse, the B-phase pulse, and the B'-phase pulse) at a frequency fs (starting frequency) to start the vibration type actuator 200. When the pulse width is increased, the effective drive voltage is increased. As a result, the power is also increased. The pulse width is fixed when a predetermined first power limit P-Lim$_1$ (first power value) is reached as shown in the upper part of FIG. 5. Here, the pulse width is fixed when the pulse width reaches a duty cycle of 22% as shown in FIG. 4 and the middle part of FIG. 5. When the drive frequency is decreased (shifted to the lower frequency side) in this state, as the drive frequency is brought close to the mechanical resonant frequency fr of the vibrator 214, the amplitude of the vibration excited in the vibrator 214 is increased, such that the speed of the rotor 207 is increased as shown in the lower part of FIG. 5.

In Comparative Example which is a conventional driving method, since the drive frequency is decreased while keeping the pulse width fixed at 22% as shown in FIG. 4, in a case where the mechanical resonant frequency fr and the electrical resonant frequency fe are close to each other, the drive voltage is decreased, and a decrease in voltage by ΔV' occurs between the frequency fs and a frequency fx. It should be noted that the frequency fx is an arbitrary frequency lower than the frequency fs, in other words, the frequency fx is a frequency at which a decrease in voltage by ΔV from the drive voltage at the frequency fs occurs. As a result, as shown in the upper part of FIG. 5, the power does not exceed rated power P-Lim$_0$, but as shown in the lower part of FIG. 5, rated speed is not reached even when the drive frequency is decreased to the mechanical resonant frequency fr. It should be noted that the rated power P-Lim$_0$ is the rated power of the vibration type actuator 200. By driving the vibration type actuator 200 with a high output that does not exceed the rated power, it is possible to stably drive components driven with the output from the gear 210.

On the other hand, in Example 1, since the pulse width is increased when the power falls below a predetermined second power limit P-Lim$_2$ (second power value) during the operation of decreasing the drive frequency, even in a case where the mechanical resonant frequency fr and the electrical resonant frequency fe are close to each other, it is possible to prevent the voltage from being insufficient. However, in Example 1, the maximum value of the pulse width is set to a duty cycle of 50%, and the reason thereof will be described later. As a result, as shown in the lower part of FIG. 5, it is possible to drive the rotor 207 at a speed that greatly exceeds the rated speed, and thus, it is possible to perform driving with a margin. Such a drive sequence according to Example 1 will be described with reference to the flowchart shown in FIG. 6.

Figure 6:
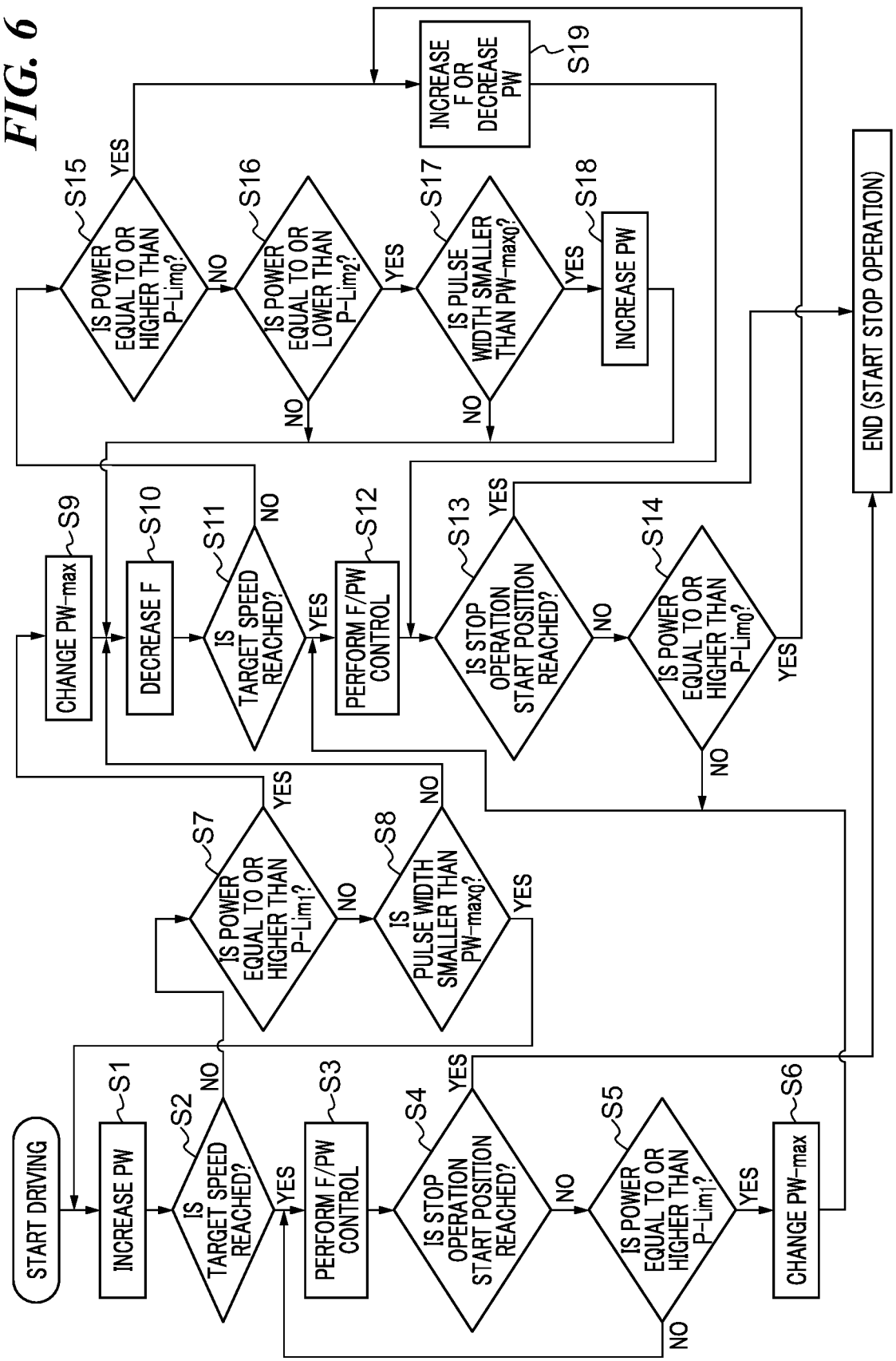
FIG. 6 is a flowchart of a drive sequence of Example 1 of the vibration type actuator.

FIG. 6 is a flowchart for describing the drive sequence of the vibration type actuator 200 according to Example 1, performed by the drive control device 100. Each processing (step) indicated by S and a number in the flowchart of FIG. 6 is implemented in a manner that the microcomputer unit 1 executes a predetermined program to control the operation of each component included in the drive control device 100. It should be noted that the flowchart of FIG. 6 shows a control from the start of the rotation of the rotor 207 to the start of a stop operation.

In S1, the microcomputer unit 1 turns on the drive signal at the frequency fs and gradually increases the pulse width (referred to as "PW" in FIG. 6) of the drive signal from zero (0). The rate of increase may be uniform with respect to time, or may be in accordance with a predetermined speed command value. In S2, the microcomputer unit 1 determines whether or not the speed of the rotor 207 has reached a target speed. In a case where the microcomputer unit 1 determines that the speed of the rotor 207 has reached the target speed (YES in S2), the processing proceeds to S3, and in a case where the microcomputer unit 1 determines that the speed of the rotor 207 has not reached the target speed (NO in S2), the processing proceeds to S7.

In S3, the microcomputer unit 1 performs a speed control for the rotor 207 by a frequency control or pulse width control (referred to as "F/PW control" in FIG. 6). In the speed control here, in a case where the speed of the rotor 207 is lower than the target speed, the pulse width of the drive signal is increased to increase the speed, and in a case where the speed of the rotor 207 is higher than the target speed, the pulse width of the drive signal is decreased to decrease the speed. It should be noted that, due to an increase in external load during driving or the like, the speed of the rotor 207 may be decreased, and the pulse width may reach the maximum pulse width PW-max (specifically, 50% which is an initial value). In this case, although not described in the flowchart, the speed control may be performed by decreasing the drive frequency to increase the speed and then adjusting the drive frequency as necessary.

In S4, the microcomputer unit 1 determines whether or not the rotation angle of the rotor 207 has reached a stop operation start position. It should be noted that the stop operation start position is determined in consideration of a position where the rotor 207 finally stops and the current speed of the rotor 207. In a case where the microcomputer unit 1 determines that the stop operation start position is reached (YES in S4), the microcomputer unit 1 ends the processing and starts the stop operation, and in a case where the microcomputer unit 1 determines that the stop operation start position is not reached (NO in S4), the processing proceeds to S5. In S5, the microcomputer unit 1 determines whether or not the power is equal to or higher than the first power limit P-Lim$_1$. In a case where the microcomputer unit 1 determines that the power is lower than the first power limit P-Lim$_1$ (NO in S5), the processing returns to S3, and in a case where the microcomputer unit 1 determines that the power is equal to or higher than the first power limit P-Lim$_1$ (YES in S5), the processing proceeds to S6.

In S6, the microcomputer unit 1 changes the maximum pulse width PW-max to a pulse width obtained by subtracting a certain value from the pulse width immediately before or at a moment when the power exceeds the first power limit P-Lim$_1$. It should be noted that an initial value of the maximum pulse width PW-max is PW-max$_0$. Here, the first power limit P-Lim$_1$ is set to a value at which the power does not exceed the rated power P-Lim$_0$ even in a case where the power overshoots due to disturbance or the like, and the first power limit P-Lim$_1$ is preferably set to a value corresponding to 80% to 95% of the rated power P-Lim$_0$. On the other hand, the second power limit P-Lim$_2$ is set to a value which is lower than the first power limit P-Lim$_1$ and at which a sufficient output can be obtained within the rated power, and the second power limit P-Lim$_2$ is preferably set to a value corresponding to 70% to 90% of the rated power P-Lim$_0$. In the microcomputer unit 1, the processing proceeds to S12 after the processing in S6.

Meanwhile, in a case where the microcomputer unit 1 determines in S2 that the speed of the rotor 207 has not reached the target speed (NO in S2), the processing proceeds to S7. In S7, the microcomputer unit 1 determines whether or not the power is equal to or higher than the first power limit P-Lim$_1$. In a case where the microcomputer unit 1 determines that the power is equal to or higher than the first power limit P-Lim$_1$ (YES in S7), the processing proceeds to S9, and in a case where the microcomputer unit 1 determines that the power is lower than the first power limit P-Lim$_1$ (NO in S7), the processing proceeds to S8.

In S8, the microcomputer unit 1 determines whether or not the pulse width of the drive signal is smaller than PW-max$_0$. In a case where the microcomputer unit 1 determines that the pulse width is smaller than PW-max$_0$ (YES in S8), the processing returns to S1, and in a case where the microcomputer unit 1 determines that the pulse width is equal to or larger than PW-max$_0$ (NO in S8), the processing proceeds to S10.

It should be noted that PW-max$_0$, which is the initial value of the maximum pulse width, is a fixed value set according to the power supply voltage. Usually, a battery has the highest voltage when it is fully charged (100%), and the battery has the lowest voltage immediately before it runs out of power. Since the drive control device 100 does not use the DC/DC converter, the drive voltage is decreased and the output is decreased accordingly in this state.

Figure 7A:
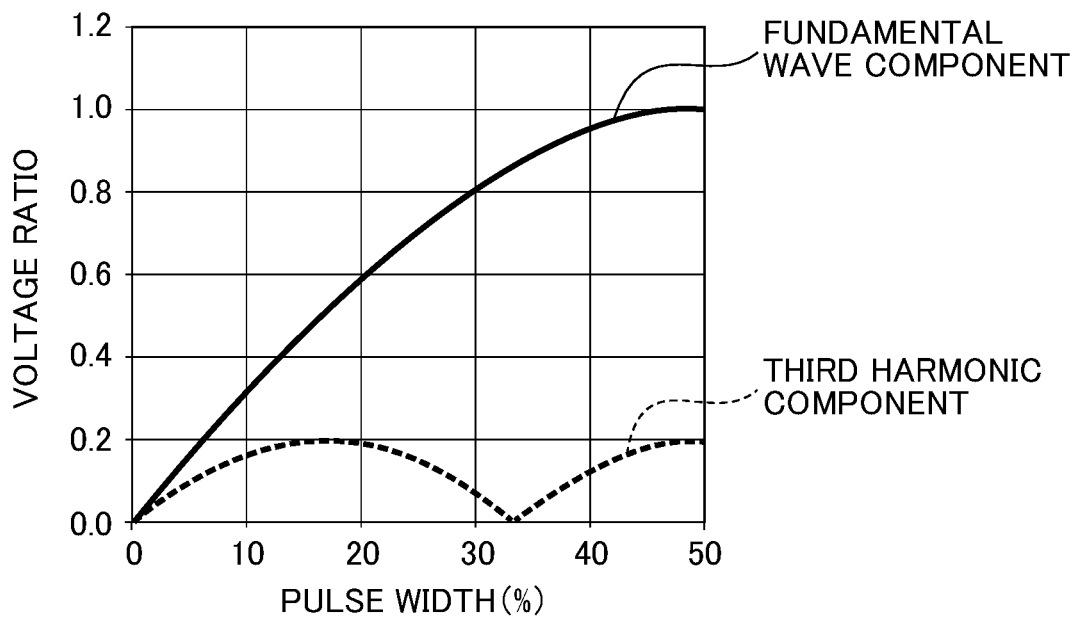
FIG. 7A is a graph for describing a relationship between a pulse width of the drive signal and a voltage ratio.
Figure 7B:
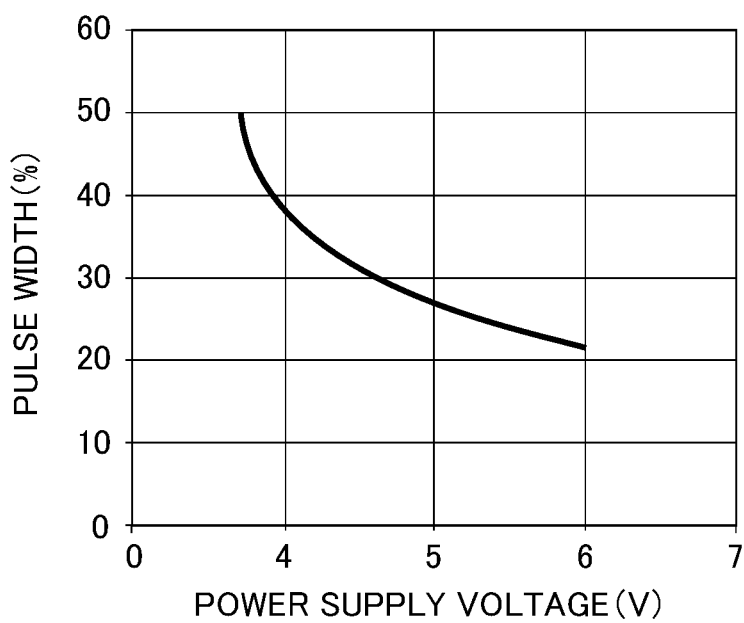
FIG. 7B is a graph for describing a pulse width of a drive signal set with respect to a power supply voltage.

Here, a method for setting the initial value PW-max$_0$ of the maximum pulse width will be described with reference to FIGS. 7A and 7B. FIG. 7A is a graph showing a relationship between the pulse width of the drive signal and a voltage ratio. The voltage ratio of a fundamental wave component when the pulse width is 50% is set to 1. The fundamental wave component referred to here is a voltage component having the same frequency as the drive signal. The voltage of a square wave is composed of a combination of different sine waves (a fundamental wave and harmonics thereof), and a component ratio thereof varies depending on the pulse width. In other words, it is possible to control the voltage of the fundamental wave component by changing the pulse width. FIG. 7B is a graph for describing the pulse width of the drive signal set with respect to the power supply voltage. Since the power supply voltage fluctuates depending on the state of the battery as described above, it is possible to keep the voltage of the fundamental wave component constant by determining the pulse width of the drive signal according to the value of the power supply voltage. In the drive sequence according to Example 1, as shown in FIG. 7B, the initial value PW-max$_0$ of the maximum pulse width of the drive signal is set to 50% for the lowest power supply voltage. Then, the maximum pulse width PW-max is changed so as to make the voltage of the fundamental wave component the same as this, thereby preventing the fluctuation of the drive voltage.

The flowchart of FIG. 6 will be described again. In S9 which follows in a case of YES in S7, the microcomputer unit 1 changes the maximum pulse width PW-max to a value obtained by subtracting a certain value from the pulse width immediately before or at a moment when the power exceeds the first power limit P-Lim$_1$. It should be noted that the initial value of the maximum pulse width is set to PW-max$_0$. As a result, it is possible to prevent the power from exceeding the rated power P-Lim$_0$. The control in S1, S2, and S7 to S9 up to this point corresponds to a control until the power reaches the first power limit P-Lim$_1$ at the frequency fs in FIG. 5.

In S10, the microcomputer unit 1 increases the speed of the rotor 207 by decreasing the drive frequency while maintaining the pulse width of the drive signal. The processing in S10 may be performed by open driving or may be performed according to the speed command value. In a case of accelerating the rotor 207 to the target speed by open driving, it is sufficient that the drive frequency is monotonically decreased. On the other hand, in a case of following the speed command value, basically, the drive frequency is decreased. However, since the actual speed of the rotor 207 may exceed the speed command value, it may be necessary to increase and decrease the drive frequency.

In S11, the microcomputer unit 1 determines whether or not the speed of the rotor 207 has reached the target speed. In a case where the microcomputer unit 1 determines that the speed of the rotor 207 has reached the target speed (YES in S11), the processing proceeds to S12, and in a case where the microcomputer unit 1 determines that the speed of the rotor 207 has not reached the target speed (NO in S11), the processing proceeds to S15. In S12, the microcomputer unit 1 performs a speed control for the rotor 207 by the frequency control or pulse width control. In the speed control here, when the speed of the rotor 207 has not reached the target speed, the drive frequency is decreased to increase the speed, and when the speed of the rotor 207 has exceeded the target speed, the drive frequency is increased (shifted to the higher frequency side) to decrease the speed.

It should be noted that, although not shown, the speed control is performed by adjusting the pulse width in a case where the speed of the rotor 207 is increased and thus the drive frequency reaches the frequency fs due to a decrease in external load during driving. In this way, the speed control is performed by changing (adjusting) the drive frequency at lower frequencies than the frequency fs, and the speed control is performed by increasing/decreasing (adjusting) the pulse width at the frequency fs.

In S13, the microcomputer unit 1 determines whether or not the stop operation start position is reached. The processing in S13 is equivalent to the processing in S4. In a case where the microcomputer unit 1 determines that the stop operation start position is reached (YES in S13), the microcomputer unit 1 ends the processing and starts the stop operation, and in a case where the microcomputer unit 1 determines that the stop operation start position is not reached (NO in S13), the processing proceeds to S14. In S14, the microcomputer unit 1 determines whether or not the power is equal to or higher than the rated power P-Lim$_0$. In a case where the microcomputer unit 1 determines that the power is lower than the rated power P-Lim$_0$ (NO in S14), the processing returns to S12, and in a case where the microcomputer unit 1 determines that the power is equal to or higher than the rated power P-Lim$_0$ (YES in S14), the processing proceeds to S19.

In S15 which is processing that follows a case in which it is determined in S11 that the speed of the rotor 207 has not reached the target speed, the microcomputer unit 1 determines whether or not the power is equal to or higher than the rated power P-Lim$_0$. In a case where the microcomputer unit 1 determines that the power is lower than the rated power P-Lim$_0$ (NO in S15), the processing proceeds to S16, and in a case where the microcomputer unit 1 determines that the power is equal to or higher than the rated power P-Lim$_0$ (YES in S15), the processing proceeds to S19.

The processings in S16 to S18 are characteristic processings in the drive sequence according to Example 1. In S16, the microcomputer unit 1 determines whether or not the power is equal to or lower than the second power limit P-Lim$_2$. In a case where the microcomputer unit 1 determines that the power is equal to or lower than the second power limit P-Lim$_2$ (YES in S16), the processing proceeds to S17, and in a case where the microcomputer unit 1 determines that the power exceeds the second power limit P-Lim$_2$ (NO in S16), the processing returns to S10. In S17, the microcomputer unit 1 determines whether or not the maximum pulse width of the drive signal is smaller than PW-max$_0$. In a case where the microcomputer unit 1 determines that the pulse width is smaller than PW-max$_0$ (YES in S17), the processing proceeds to S18, and in a case where the microcomputer unit 1 determines that the pulse width is equal to or larger than PW-max$_0$ (NO in S17), the processing returns to S10. In S18, the microcomputer unit 1 increases the pulse width of the drive signal, and then the processing returns to S10.

Such routines of S10, S11, and S15 to S18 correspond to the control in which the drive frequency is decreased from the frequency fs to the frequency fx after the power reaches the first power limit P-Lim$_1$ in FIG. 5. It should be noted that, as described above with reference to FIGS. 7A and 7B, in the drive sequence according to Example 1, the maximum value of the pulse width of the drive signal is set to a duty cycle of 50% in consideration of the power supply voltage. Therefore, after fixing the pulse width to 50%, the pulse width is not increased even when the power falls below the second power limit P-Lim$_2$, but the speed of the rotor 207 can be increased by decreasing the drive frequency.

While the loop of S10, S11, and S15 to S18 described above is performed, the pulse width is increased between the frequency fs and the frequency fx, and the power becomes substantially constant, as shown in Example 1 in the middle and upper parts of FIG. 5. In other words, in Comparative Example, as the drive voltage is decreased, the power is decreased and the speed is insufficient, however, in Example 1, the decrease in drive voltage is prevented by increasing the pulse width, and as a result, the power becomes substantially constant, and the speed is sufficient. It should be noted that, for stable driving, it is desirable that the variation in power in a section where the power is constant (a section where the power is maintained at the second power limit P-Lim$_2$) is 10% or less of the value of the second power limit P-Lim$_2$.

In a case where the microcomputer unit 1 determines in S14 that the power is equal to or higher than the rated power P-Lim$_0$ (YES in S14), or in a case where the microcomputer unit 1 determines in S15 that the power is equal to or higher than the rated power P-Lim$_0$ (YES in S15), the processing proceeds to S19. In S19, the microcomputer unit 1 decreases the power by increasing the drive frequency or decreasing the pulse width, and then the processing returns to S13. The drive sequence according to Example 1 is as described above.

It should be noted that, in the flowchart of FIG. 6, various determinations are made on the basis of the value of the power, but the current detected by the current detection circuit 3 may also be used as a determination criterion. Further, although each processing of the stop operation is not described in the flowchart of FIG. 6, the control of the stop operation basically follows a reverse path in terms of the power, the pulse width, and the speed to that at the time of the start. That is, when the stop operation start position is reached, a decrease in speed is started by increasing the drive frequency. Further, when the power is equal to or higher than the first power limit P-Lim$_1$, the power is decreased by decreasing the pulse width. When the drive frequency reaches the frequency fs by repeating these steps, the pulse width is decreased regardless of the power, and the rotor 207 is stopped at a stop position.

As described above, even in a case where the amount ΔV of voltage change is large over the drive frequency range because the mechanical resonant frequency fr and the electrical resonant frequency fe are close to each other, it is possible to drive the vibration type actuator 200 with a stable output over the entire drive frequency range by applying the drive sequence of FIG. 6 to the drive control device 100 having a simple circuit configuration.

Second Embodiment

In a second embodiment, a drive sequence in a case where the second power limit P-Lim$_2$ and the first power limit P-Lim$_1$ have the same value will be described. The first embodiment and the second embodiment are different from each other only in regard to the control performed by the microcomputer unit 1, and only this difference will be described below.

Figure 8:
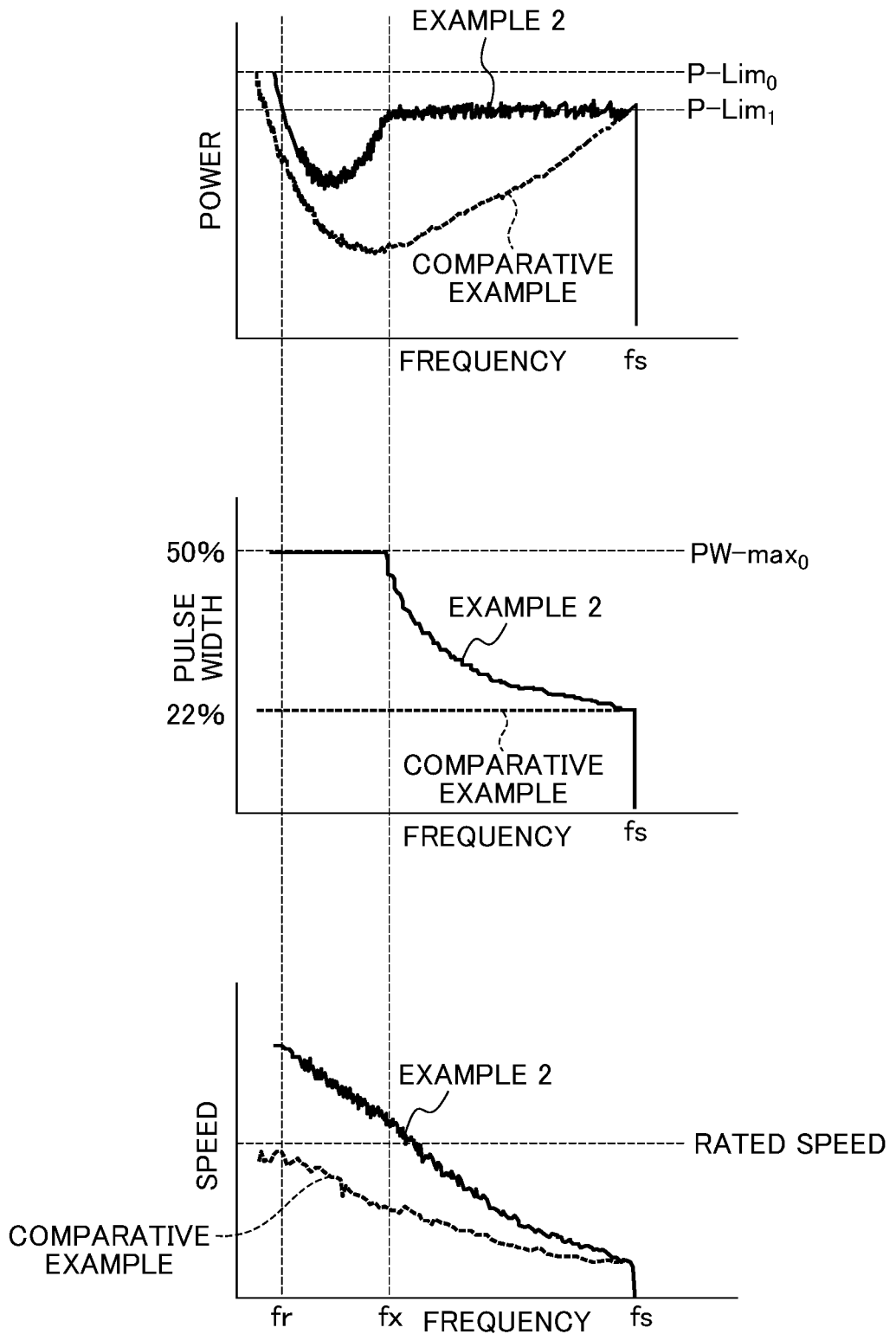
FIG. 8 is a diagram showing comparison of characteristics in drive sequences according to Example 2 and Comparative Example, respectively.

FIG. 8 is a diagram showing comparison of characteristics in drive sequences according to Example 2 of the vibration type actuator 200 and Comparative Example, respectively. The upper part of FIG. 8 shows a relationship between the drive frequency and the power (upper part), the middle part of FIG. 8 shows a relationship between the drive frequency and the pulse width, and the lower part of FIG. 8 shows a relationship between the drive frequency and the speed. As in Example 1, the vibration type actuator 200 is started by gradually increasing the pulse width of the drive signal at the frequency fs in Example 2. As the pulse width is increased, the speed of the rotor 207 is gradually increased, and the power is also increased. When the power reaches the first power limit P-Lim$_1$, the pulse width is fixed (22% in the middle part of FIG. 8).

When the drive frequency is decreased from this point, the drive frequency approaches the mechanical resonant frequency fr of the vibrator 214, and thus, the vibration amplitude of the vibrator 214 is increased, and the speed of the rotor 207 is increased. In this case, in the conventional drive method according to Comparative Example, since the drive frequency is decreased while keeping the pulse width of the drive signal fixed at 22%, the voltage is decreased as shown in FIG. 4, and a decrease in voltage by ΔV' occurs between the frequency fs and the frequency fx. As a result, in Comparative Example, the power does not exceed the rated power P-Lim$_0$ as shown in the upper part of FIG. 8, but the speed of the rotor 207 does not exceed the rated speed even when the frequency of the drive signal is decreased to the mechanical resonant frequency fr as shown in the lower part of FIG. 8.

On the other hand, in Example 2, when the power becomes equal to or lower than the first power limit P-Lim$_1$, the pulse width of the drive signal is increased to prevent the voltage from becoming insufficient. As a result, the speed of the rotor 207 greatly exceeds the rated speed, thereby enabling driving with a margin. In addition, as the first power limit P-Lim$_1$ is set to a value that does not exceed the rated power P-Lim$_0$ even when the power overshoots due to disturbance or the like, the power consumption is increased. However, the drive voltage is also increased. Therefore, it is possible to obtain a higher and more stable output without exceeding the rated power.

Third Embodiment

Figure 9:
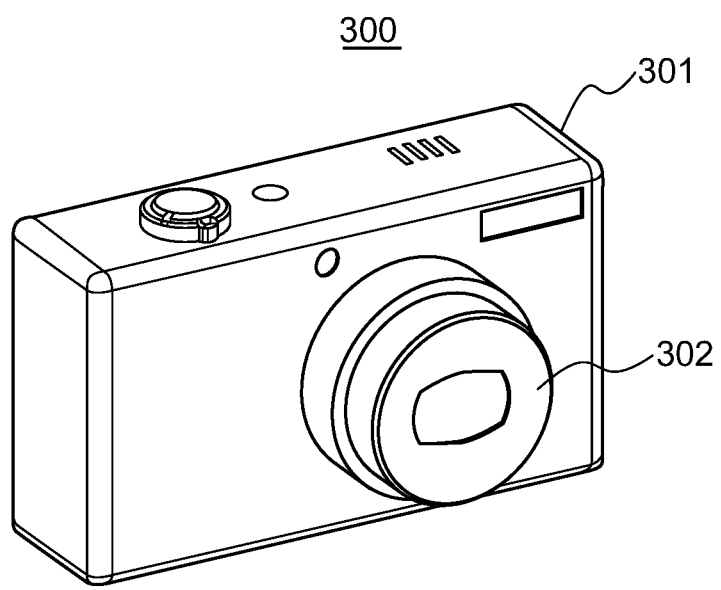
FIG. 9 is a perspective view showing an appearance of a digital camera including a vibration type drive device.

In a third embodiment, a digital camera (image pickup apparatus) as an example of an apparatus including the vibration type drive device will be described. FIG. 9 is a perspective view showing an appearance of a digital camera 300. The digital camera 300 includes a camera body 301 and a lens barrel 302 disposed on a front surface of the camera body 301. A plurality of lens groups (not shown) including a focus lens that can move in an optical axis direction of the lens barrel 302 is disposed in the lens barrel 302. Further, in the lens barrel 302, the gear 210 of the vibration type actuator 200 meshes with a gear (rotation transmission member) for moving the focus lens disposed in the lens barrel 302 in the optical axis direction.

The vibration type actuator 200 is driven by the drive control method according to Example 1 or 2, and as the focus lens is stably and rapidly moved in the optical axis direction, it is possible to implement smooth focusing on a subject. Further, since the drive control device 100 has a simple circuit configuration, the size of the camera body 301 is hardly increased even when the drive control device 100 is mounted on the camera body 301. It should be noted that the vibration type actuator 200 can also be used to drive a zoom lens included in the lens barrel 302 in the optical axis direction.

Although the present invention has been described above in detail on the basis of the preferred embodiments thereof, each embodiment is merely an embodiment of the present invention, and the respective embodiments can be appropriately combined with each other.

For example, in the above embodiment, the structure in which the relative movement between the vibrator and the contact body appears as a rotational motion has been described as the structure of the vibration type actuator controlled by the drive control device 100. However, the configuration of the vibration type actuator is not limited thereto. For example, the drive control methods of Examples 1 and 2 can also be applied to the driving of a linear drive type vibration type actuator in which the relative movement between the vibrator and the contact body appears as a linear motion.

Further, in the third embodiment, the digital camera to which the vibration type drive device is applied has been described. However, the specific application example of the vibration type drive device is not limited thereto. The vibration type drive device can be widely applied to an apparatus (equipment) including a component that is required to be positioned by driving the vibration type actuator 200.

According to the present invention, with a simple circuit configuration, a stable output can be obtained from the vibration type actuator even in a case where the amount of voltage change is large over the drive frequency range because the mechanical resonant frequency and the electrical resonant frequency are close to each other.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. A vibration type drive device comprising:
a vibration type actuator including a vibrator and a contact body that move relative to each other; and
a drive control device configured to control a drive voltage to be applied to the vibration type actuator and a frequency of the drive voltage, wherein the drive control device increases the drive voltage to accelerate driving of the vibration type actuator from when the vibration type actuator is started to when a target speed of the relative movement is reached, the drive control device decreases the frequency of the drive voltage without changing the drive voltage when power supplied to the vibrator exceeds a first power value, and the drive control device increases the drive voltage when the power falls below a second power value that is smaller than the first power value during an operation of decreasing the frequency.

2. The vibration type drive device according to claim 1, wherein the drive control device further includes an oscillation unit generating a pulse signal, generates the drive voltage by switching a direct current power supply voltage with the pulse signal, changes the drive voltage by changing a pulse width of the pulse signal, and changes the frequency of the drive voltage by changing a frequency of the pulse signal.

3. The vibration type drive device according to claim 2, wherein a maximum value of the pulse width is set according to a voltage value of the power supply voltage, and
when the pulse width reaches the maximum value, the drive control device does not increase the pulse width even when the power falls below the second power value.

4. The vibration type drive device according to claim 3, wherein the drive control device changes the pulse width and the frequency of the pulse signal so that a variation in the power is equal to or less than 10% of the second power value until the pulse width reaches the maximum value in an operation of increasing the drive voltage by increasing the pulse width after the power falls below the second power value that is smaller than the first power value.

5. The vibration type drive device according to claim 1, wherein the drive control device monotonically decreases the frequency of the drive voltage in the operation of decreasing the frequency thereof.

6. The vibration type drive device according to claim 1, wherein the drive control device controls the frequency of the drive voltage on a basis of a predetermined speed command value in the operation of decreasing the frequency thereof.

7. The vibration type drive device according to claim 1, wherein a difference between a resonant frequency of the drive control device and a resonant frequency of the vibrator is in a range of 8 kHz to 30 kHz.

8. An apparatus comprising:
the vibration type drive device according to claim 1; and
a member configured to be positioned by driving the vibration type actuator controlled by the drive control device of the vibration type drive device.

9. A vibration type drive device comprising:
a vibration type actuator including a vibrator and a contact body that move relative to each other; and
a drive control device configured to control a drive voltage to be applied to the vibration type actuator and a frequency of the drive voltage,
wherein the drive control device increases the drive voltage to accelerate driving of the vibration type actuator from when the vibration type actuator is started to when a target speed of the relative movement is reached, and the drive control device decreases the frequency of the drive voltage and increases the drive voltage when power supplied to the vibrator exceeds a predetermined power value.

10. The vibration type drive device according to claim 9, wherein the drive control device further includes an oscillation unit generating a pulse signal, generates the drive voltage by switching a direct current power supply voltage with the pulse signal, changes the drive voltage by changing a pulse width of the pulse signal, and changes the frequency of the drive voltage by changing a frequency of the pulse signal.

11. The vibration type drive device according to claim 10, wherein a maximum value of the pulse width is set according to a voltage value of the power supply voltage, and
when the pulse width reaches the maximum value, the drive control device does not increase the pulse width even when the power falls below the predetermined power value.

12. The vibration type drive device according to claim 11, wherein the drive control device changes the pulse width and the frequency of the pulse signal so that a variation in the power is equal to or less than 10% of the predetermined power value until the pulse width reaches the maximum value in an operation of increasing the drive voltage by increasing the pulse width after the power falls below the predetermined power value.

13. The vibration type drive device according to claim 9, wherein the drive control device monotonically decreases the frequency of the drive voltage in the operation of decreasing the frequency thereof.

14. The vibration type drive device according to claim 9, wherein the drive control device controls the frequency of the drive voltage on a basis of a predetermined speed command value in the operation of decreasing the frequency thereof.

15. The vibration type drive device according to claim 9, wherein a difference between a resonant frequency of the drive control device and a resonant frequency of the vibrator is in a range of 8 kHz to 30 kHz.

16. An apparatus comprising:
the vibration type drive device according to claim 9; and
a member configured to be positioned by driving the vibration type actuator controlled by the drive control device of the vibration type drive device.

17. A drive control device for a vibration type actuator including a vibrator and a contact body that move relative to each other, the drive control device comprising:
an amplification unit configured to amplify a power supply voltage to generate a drive voltage to be applied to the vibrator; and
a control unit configured to control the generation of the drive voltage performed by the amplification unit,
wherein the drive control device increases the drive voltage to accelerate driving of the vibration type actuator from when the vibration type actuator is started to when a target speed of the relative movement is reached, the drive control device decreases a frequency of the drive voltage without changing the drive voltage when power supplied to the vibrator exceeds a first power value, and the drive control device increases the drive voltage when the power falls below a second power value that is smaller than the first power value during an operation of decreasing the frequency.

18. A drive control device for a vibration type actuator including a vibrator and a contact body that move relative to each other, the drive control device comprising:
an amplification unit configured to amplify a power supply voltage to generate an alternating current drive voltage to be applied to the vibrator; and a control unit configured to control the generation of the drive voltage performed by the amplification unit, wherein the drive control device increases the drive voltage to accelerate driving of the vibration type actuator from when the vibration type actuator is started to when a target speed of the relative movement is reached, and the drive control device decreases a frequency of the drive voltage and increases the drive voltage when power supplied to the vibrator exceeds a predetermined power value.

19. A drive control method for a vibration type actuator including a vibrator and a contact body that move relative to each other, the drive control method comprising:

a step of increasing a drive voltage to accelerate driving of the vibration type actuator from when the vibration type actuator is started to when a target speed of the relative movement is reached;

a step of decreasing a frequency of the drive voltage without changing the drive voltage when power supplied to the vibrator exceeds a first power value; and a step of increasing the drive voltage when the power falls below a second power value that is smaller than the first power value during an operation of decreasing the frequency.

20. A drive control method for a vibration type actuator including a vibrator and a contact body that move relative to each other, the drive control method comprising:

a step of increasing a drive voltage to accelerate driving of the vibration type actuator from when the vibration type actuator is started to when a target speed of the relative movement is reached; and a step of decreasing a frequency of the drive voltage and increasing the drive voltage when power supplied to the vibrator exceeds a predetermined power value.

* * * * *